Sept. 6, 1966　　　　　J. H. LOWE　　　　　3,270,419
OPTICAL LEVEL FOR BUILDERS
Filed Oct. 8, 1964　　　　　　　　　　　　　2 Sheets-Sheet 1
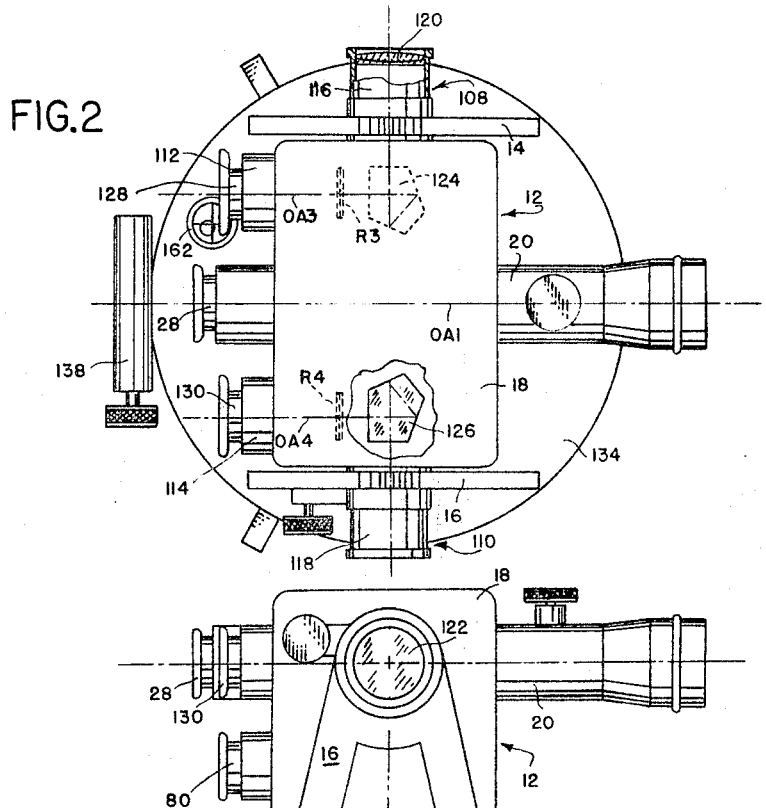
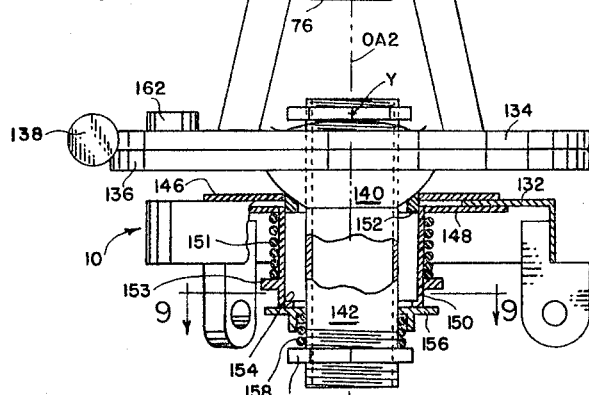
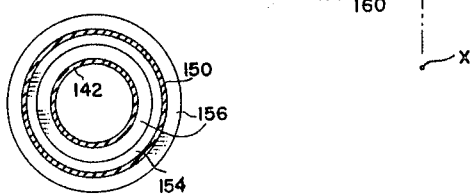
INVENTOR.
JOHN H. LOWE
BY Graybeal, Cole & Barnard
ATTORNEYS Sept. 6, 1966 J. H. LOWE 3,270,419
OPTICAL LEVEL FOR BUILDERS
Filed Oct. 8, 1964 2 Sheets-Sheet 2
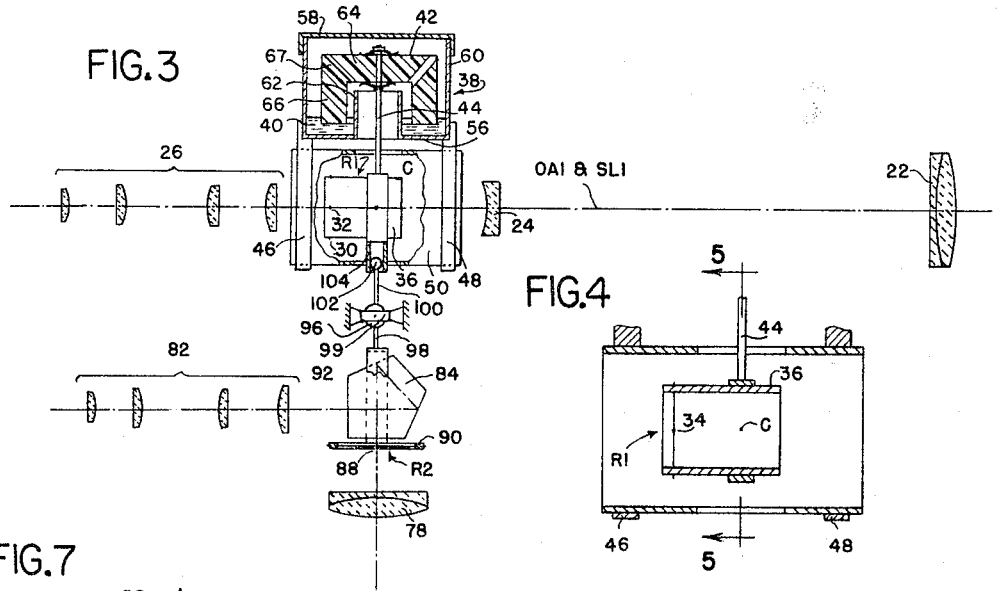
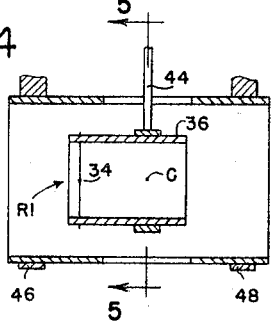
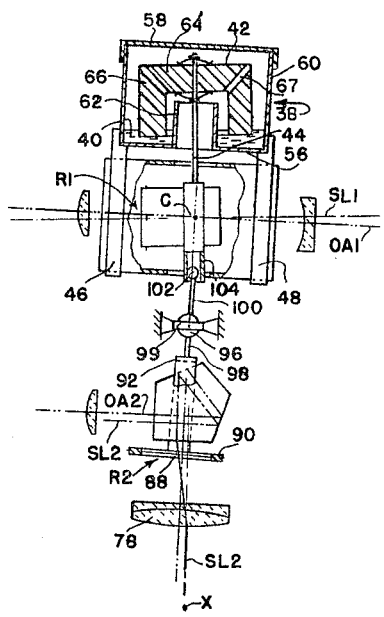
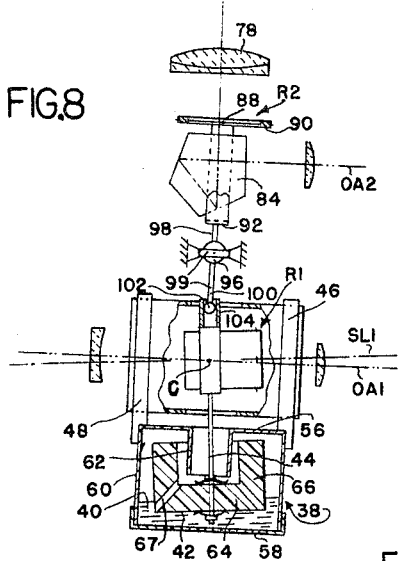
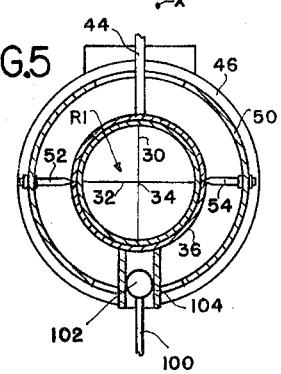
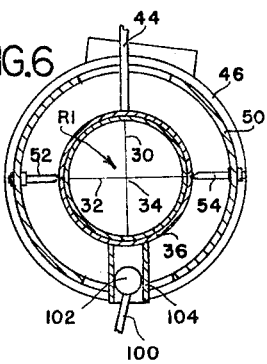
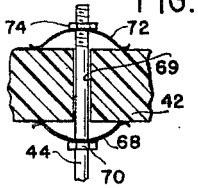
INVENTOR.
JOHN H. LOWE
BY Graybeal, Cole, & Barnard
ATTORNEYS

United States Patent Office 3,270,419
Patented Sept. 6, 1966

3,270,419
OPTICAL LEVEL FOR BUILDERS
John H. Lowe, P.O. Box 924, Seaside, Oreg.
Filed Oct. 8, 1964, Ser. No. 402,436
18 Claims. (Cl. 33—73)

The present invention relates to an optical instrument for establishing a horizontal line of sight. More specifically, it relates to an optical instrument that is basically a level, but which is also capable of establishing right angles.

The level of the present invention is of the self-leveling type; the level line of sight is automatically determined by means of a float device. A float automatically maintains the line of sight parallel with the surface of a body of liquid in which the float is supported.

The instrument of the present invention may involve a nadir telescope for use in plumbing the instrument. The optical system of such nadir telescope includes a reticle that is operably connected to the float in a manner such that the float serves to maintain the nadir sight line, as viewed by the user, exactly perpendicular to the surface of the body of liquid and the level line of sight.

Builders have a need for an instrument that can be used to establish points in the three basic building planes, viz. a horizontal plane and two right angle related vertical planes, but which does not take the skill of a trained surveyor to operate. The instrument must be easy to set up and require few manipulations of parts in its use. A principal object of the present invention is to provide an instrument which meets these criteria.

Another object of the present invention is to provide a simple and relatively inexpensive level for use by builders and the like, which level is provided with an invertible telescope containing an automatic leveling mechanism operable to automatically establish level line of sight, both when the telescope is upright and when it is inverted or upside down.

Other objects, features, and advantages of this invention include the provision of an instrument which is both a level and a right angle transit, adapted for use by builders and other persons having a need for such an instrument and who are unskilled with respect to the operation of a surveyor's level or transit, which instrument comprises:

(a) A telescope for use in forward sighting, a reticle support tube in the optical system of said telescope, said tube having a longitudinal center axis, a reticle in said support tube having a center lying on said center axis, means mounting said support tube for universal movement about a point lying on both the optical axis of the telescope and the center line axis of the support tube, a confined body of liquid, and means including a float for maintaining the longitudinal axis of said support tube exactly parallel with the surface of said body of liquid;

(b) A nadir telescope involving a right angle optical system having an optical axis that includes a forward portion related perpendicularly to the optical axis of said main telescope, and which passes through the center of universal movement of said reticle support tube, a reticle interposed between an objective lens and a penta prism, means mounting said reticle for universal swinging movement about a fixed point on the vertical axis of the instrument, which axis coincides with the said forward portion of the optical axis of the nadir optical system and passes through the point of universal movement of the reticle support tube, and means interconnecting said swinging reticle with the float in a manner such that the line of sight through the nadir system, as viewed by the user, is automatically related perpendicularly to the surface of the body of liquid and the longitudinal axis of the reticle support tube;

(c) The means mounting the reticle tube for universal movement includes a pair of pivots entering laterally into the sides of said reticle tube from diametrically opposite locations, the body of liquid and float supported therein are offset vertically from said support tube, and a rod or the like interconnects between said support tube and the float so that the motion of the latter is transferred to the former, and spring means are interposed between said rod and the float in a manner such that the float may move relatively axially along said rod in response to forces on it caused by expansion or contraction of the body of liquid, so that such forces do not overly stress the pivots;

(d) A lateral telescope situated on each side of the forward telescope, each comprising a right angle optical system having an optical axis, the forward portion of which extends perpendicularly to the optical axis of the forward telescope in a generally horizontal plane, and perpendicularly to the forward portion of the optical axis of the nadir telescope in a generally vertical plane; and (e) Means mounting the entire telescope assembly for pivotal movement about a transverse axis, said means including a pair of standards between which the telescope assembly is situated, a base on which said standards are mounted, a sight tube extending through and depending below said base, a universal mounting member having a downwardly facing spherical base surface interconnecting between said tube and said base, a mounting head for securement of the instrument onto the top of a tripod or the like, said head having an open center bordered by an annular seat having an upwardly facing spherical support surface engaging the spherical base surface of the universal mounting member, and means for adjustably affixing the angular position of the lower end of said sight tube relative to the center of curvature of said spherical support surface.

These and other objects, features, and advantages of the present invention will be apparent from the following description, appended claims, and annexed drawings.

Referring to the drawings, wherein like reference characters designate like parts throughout the several views:

FIG. 1 is a side elevational view of an optical instrument incorporating the various features which characterize the present invention, with parts of such view being cut away and other parts being in section for sake of clarity of illustration;

FIG. 2 is a top plan view of the builder's level shown by FIG. 1, with a part of the top of the casing being cut away so as to present a top plan view of the right angle prism in the optical system of one of the lateral telescopes;

FIG. 3 is a diagrammatic illustration of the optical systems for the forward and nadir telescopes, with some parts cut away and other parts in section so as to clearly illustrate the construction and arrangement of the float actuated mechanism which serves to automatically level the axis of the reticle support tube and properly relate the line of sight viewed through the nadir telescope to the axis of said tube;

FIG. 4 is an enlarged scale longitudinal sectional view through the reticle support tube and the means mounting it for universal movement;

FIG. 5 is an enlarged scale cross sectional view taken through the reticle support tube and the means mounting it for universal movement, with parts being shown in elevation, such view being taken substantially along line 5—5 of FIG. 4 and showing the relative positions of the various parts when the float chamber is in a vertical position;

FIG. 6 is a view like FIG. 5, but showing the relative positions of the several parts when the float chamber is tilted laterally to one side of a vertical position;

FIG. 7 is a view like FIG. 3, with some of the lenses omitted, and with the optical axis of forward telescope declining forwardly from horizontal, the center line axis of the reticle support tube, maintained in a horizontal position, and the line of sight of the nadir telescope maintained perpendicularly to it, such view showing the line of sight of the forward telescope, i.e., by the float mechanism;

FIG. 8 is a view similar to FIG. 7, but showing the telescope assembly in an inverted position;

FIG. 9 is a cross sectional view through the lower portion of the sight tube assembly showing the mechanism provided for roughly leveling the instrument, the section being taken substantially along line 9—9 of FIG. 1; and FIG. 10 is an enlarged scale fragmentary view of the central portion of the float, showing the connector rod extending through an enlarged opening in the float, and showing the elliptic springs which provide a yielding connection between the rod and the float.

Referring to FIGS. 1 and 2, the illustrated embodiment of the invention is shown to include a mounting head 10 adapted to be secured to a tripod of similar type support. A telescope assembly 12 is supported above the mounting head 10 by support structure that includes a pair of upright standards 14, 16.

Telescope assembly 12 includes a casing 18 in which is housed a telescope 20, hereinafter termed the "forward" telescope. By way of typical and therefore non-limitive example, telescope 20 is diagrammatically illustrated as being of internal focusing type (FIG. 3, for example). It is shown as including an objective lens 22, a focusing lens 24, and an ocular lens assembly 26 constituting the optical components of an erecting eyepiece 28 (FIGS. 1 and 2). These lenses and their arrangement are conventional per se and for this reason will not be specifically described. They are illustrated and specifically described on pages 840–851 of the text, "Surveying Theory and Practice," by John Clayton Tracy, published 1947 by John Wiley and Sons, Inc.

Conventional telescopes of the type referred to above and disclosed in said text have a reticle that is fixed relative to the optical axis, with its center lying on the optical axis. The telescope itself must be precisely leveled in order to obtain a level line of sight. This customarily involves the use of a spirit level attached to the telescope. When the bubble of the spirit level is centered, the line of sight of the telescope is exactly horizontal or level. The initial leveling of such an instrument involves the manipulation of four leveling screws. During its use, the instrument must be constantly checked to insure that the telescope has stayed level. Also, the telescope must be periodically examined to determine if the reticle has moved any from a centered position on the optical axis of the telescope, due to handling of the instrument. Each of the above procedures require a specialized skill that is ordinarily not possessed by persons engaged in the building industry.

In optical instruments according to the present invention, the reticle is not fixed but rather is movable relative to the optical axis of the telescope. As shown by FIGS. 3 and 4, reticle R1 consists of a vertical hair 30 and a horizontal hair 32, crossing at a center 34 (FIGS. 5 and 6). Reticle R1 is mounted in and adjacent the rearward end of a cylindrical, reticle support tube 36. The center 34 of the reticle R1 is located on the center line axis of tube 36. Tube 36 is mounted for universal pivotal movement about a point C on its axis, which point is offset axially forwardly of center 34. Pivot point C also lies on the optical axis OA1 of telescope 20.

A float chamber 38 is offset vertically relative to the reticle support tube 36. It contains a body of liquid 40, such as mercury, for example, and a float 32 resting on said liquid. The vertical axis of telescope 20 passes through both point C and the centroid of chamber 38. A rod 44 interconnects support tube 36 and the float 42.

Rod 44 extends along a line that passes through the point C and the centroid of float 42. The line of sight SL1 is related perpendicularly to the center line axes of rod 44 and float 42. The float 42 serves to automatically maintain the sight line SL1 exactly parallel to the surface of the body of liquid 40.

By way of analogy, the float mechanism may be compared to the spirit level associated with conventional telescopes, with the float 42 being likened to the bubble. According to the present invention, the "bubble," i.e. float 42, is operably connected to the reticle support tube 38, so that movement of the float 42 is transmitted to the support tube 36, and the line of sight is maintained level, automatically.

The preferred mechanism for mounting reticle support tube 36 for universal movement about point C comprises sleeve means in the form of a pair of axially spaced rings 46, 48 which are firmly affixed to the float chamber 38. An elongated cylinder 50 is rotatively received in said rings 46, 48. The axes of rings 46, 48 and cylinder 50 coincide with the optical axis OA1 and thus pass through point C. A pair of pivots, shown in the form of pintles 52, 54 (FIGS. 7 and 8), serve to mount support tube 36 for pivotal up and down movement within cylinder 50. Pintles 52, 54 are shown to be secured at their respective outboard ends onto cylinder 50, and to have pointed inboard ends which project into conical sockets formed at diametrically opposite locations in the sides of support tube 36. The points of pintles 52, 54 lie in a straight line that passes through point C, parallel to horizontal hair 32 and perpendicular to vertical hair 30.

Float chamber 38 is shown to include an inboard end 56, an outboard end 58, a cylindrical outer wall 60, and a tubular inner wall 62. The outboard end 58 is preferably removable to provide access to the interior of float chamber 38. The central portion of inboard end 56 is open, and the inner wall 62, surrounding such open central portion, extends from said inboard end into the float chamber towards the outboard end 58.

Float 42 is formed from a buoyant material and is cup-shaped. It includes a circular base 64 disposed between the terminal of inner wall 62 and the outboard end 58, and an annular wall portion 66 extending inwardly from said base 64 toward the inboard end 56. The cup-shaped float 42 is inverted over, and extends in surrounding, concentric relationship with, a portion of inner wall 62. The inner cavity of float 42 is large enough to provide the clearance that is needed between inner wall 62 and float 42 to permit the latter to tip relative to the former.

The inner wall 62 is of a sufficient height to prevent the liquid 40 from flowing out from its open center when the float chamber 38 is turned upside down as the telescope 20 is inverted. As will be evident, as the float chamber 38 is tipped, the surface of the body of liquid 40 will move up along one side of inner wall 62 and down along the other. However, before any of the liquid 40 flows over the top of wall 62, the float chamber 38 takes a position wherein the liquid 40 flows into the larger portion of the interior of chamber 38, situated between the terminal of wall 62 and the outboard end 58. Openings 67 are provided in float 42 so that its inner cavity will drain when the telescope 20 is inverted. Outboard end 58, which as previously mentioned is preferably removable, may be a part of a cap (as illustrated) that is threaded onto the outer wall 60. Enough threads may be provided so that the cap may be threaded in and out for the purpose of adjusting the height of the liquid when the float chamber is inverted. The terminal end of inner wall 62 forms an outlet for the chamber 38 through which the connector rod 44 extends.

As best shown by FIG. 10, the opening 69 in float 42 is slightly larger in diameter than the rod 44, so that float 42 is free to move axially relative to the rod 44. An elliptic spring 68 is interposed between a stop 70 secured to rod 44 and the inner surface of base 64. A second spring 72 of the same type is positioned between the outboard surface of base 64, and a nut 74 is screwed onto the threaded end portion of rod 44. Springs 68, 72 provide a yielding connection between float 42 and rod 44. The body of liquid 40 may expand or contract in response to changes in temperature. The yielding connection provided by the springs 68, 70 allows float 42 to slide relatively along rod 44 as the level of liquid 40 is changed in response to changes in the temperature of liquid 40. This relieves shearing stresses which would otherwise be put on the points of pintles 52, 54.

Telescope assembly 12 also includes a nadir telescope 76 which is normally disposed below the forward telescope 20. Telescope 76 includes a right angle optical system comprising an objective lens 78, an erecting eyepiece 80 (FIG. 1) having the usual ocular lens assembly 82, a fixed right angle prism 84, and a moving reticle R2. The optical axis of telescope 76 has two perpendicularly related portions, a rearward portion and a forward portion. The rearward portion extends axially through the several lenses of the eyepiece 80 forwardly into the prism 84. The forward portion extends outwardly from prism 84 through the center of objective lens 78. As clearly illustrated in FIGS. 3, 5, and 6, the rearward portion of optical axis OA2 is parallel to the optical axis OA1 of the telescope 20, and the forward portion of optical axis OA2 is related perpendicularly to optical axis OA1. Also, the forward portion of optical axis OA2 coincides with the vertical center line axis of telescope 20.

The reticle R2 is not fixed, but rather is movable laterally (along and across a circular path) relative to the forward portion of axis OA2, and its movement is influenced by the float 42 in a manner such that the line of sight SL2 through telescope 76, as viewed by the user, is exactly perpendicular to the longitudinal axis of reticle support tube 36 (i.e. the line of sight SL1 of telescope 20). Since reticle R2 is positioned rearwardly of objective lens 78, its image of the object X, as received by the user, appears to be on the opposite side of the axis OA2 from where it is actually situated. This is because the lens assembly 82 which serves to erect the inverted image received by it from objective lens 78 inverts the image of reticle R2. Consequently, when the sight line SL1 is moved a given angular amount from the optical axis OA1 of telescope 20 by float 42, the center 88 of reticle R2 must be moved a compensating angular amount from the optical axis OA2, but in the direction opposite to that which would put it in a line related perpendicularly to the sight line SL1. The means for moving the reticle R2 is shown in FIGS. 3, 5, and 6, and now will be described.

A universal joint of the ball-and-socket type is disposed between the prism 84 and the reticle support tube 36 and has its center of pivot located on the vertical centerline of telescope 20. A reticle carrier, shown in the form of a downwardly opening U-shaped frame 92, and a ring 90 secured to the ends of the arms of said frame 92, is attached to the lower portion of ball 96 by means of a short rod 98. Ball 96 is diagrammatically shown to be engaged by a socket ring 99 which is suitably anchored to the casing 18. Another rod 100 extends away from ball 96 at a diametrically opposed location from rod 98 and is provided with a ball 102 at its outer end. A tubular member 104, the longitudinal center of which is perpendicular to the sight line SL1 and parallel to vertical hair 30, extends radially outwardly from support tube 36 and surrounds the ball 102. This forms an articulated connection between support tube 36 and the reticle carrier, with ball 102 and tubular member 104 constituting a universal joint.

Casing 18 preferably also houses a pair of lateral telescopes 108, 110. As shown by FIGS. 1 and 2, the lateral telescopes 108, 110 comprise right angle optical systems. In the rearward portion 112, 114 of telescopes 108, 110 the optical axes OA3, OA4 extend perpendicularly to the optical axis OA1 of telescope 20. In the forward portions 116, 118 the optical axes OA3, OA4 extend perpendicularly to the optical axis OA1 of telescope 20 in a generally horizontal plane, and perpendicularly to the forward portion of optical axis OA2 of telescope 76 in a generally vertical plane.

The forward portions 116, 118 of the lateral telescopes 108, 110 extend through openings provided in the standards 14, 16 and preferably constitute trunnions mounting the telescope assembly 12 for up-and-down pivotal movement about a transverse axis.

Telescopes 108, 110 include objective lenses 120, 122; right angle prisms 124, 126; eyepieces 128, 130; and reticles R3, R4. The centers of the reticles R3, R4 lie on the optical axes OA3, OA4, respectively. The horizontal and vertical hairs involved in their makeup are not always horizontal and vertical during use of the instrument, but the centers of reticles R3, R4 always lie in a vertical plane that is related perpendicularly to sight line SL1. Thus, these centers may be used as sight points, in conjunction with center 34 of reticle R1, when establishing points in the right angle related vertical planes.

Although the exact leveling is performed automatically by the float mechanism, the instrument must be roughly leveled on the tripod or other support on which it is placed. The mechanism for effecting such rough leveling will now be described.

Referring again to FIG. 1, the mounting head 10 is shown as including an open-centered platform 132. The standards 14, 16 are secured at their lower ends to an upper plate 134, and the upper plate 134 is mounted so that it can be rotated relative to a lower plate 136. A fine adjustment and locking mechanism 138 is provided between the plates 134, 136. A mounting member 140 having a spherical base surface, the center of curvature of which (designated Y in FIG. 1) is disposed on the vertical axis of the instrument, directly below point C, interconnects between the lower side of plate 136 and a sight tube 142; sight tube 142 extends through both plate 134 and plate 136 and depends downwardly a substantial distance below plate 136.

An open-centered carrier is associated with the mounting head 10. It includes an annular top flange 146 disposed above platform 132, an annular bottom flange 148 disposed below the platform 132, and a cylindrical body portion 150 through which the sight tube 142 extends. As is clearly illustrated in FIG. 1, the opening in platform 132 is substantially larger than body portion 150, so that the latter can be moved laterally with respect to platform 132 within the confines of the opening in the latter. This is so that the sight tube 142 can be positioned over the object X. A helical compression spring 151 is situated between a flange 153 provided on member 150 and flange 148 for urging the latter against platform 132. This is for the purpose of providing some frictional resistance to sliding movement of the sight tube assembly relative to head 10. This frictional resistance serves to hold the parts relatively fixed when a lateral force is not being applied. Flange 153 may be threaded onto body portion 150 to provide a means for adjusting the amount of compression in spring 151.

The top opening in body portion 150 is shown to be encircled by an annular seat 152 having an upwardly facing spherical support surface that engages the spherical base surface of the mounting member 140. An inwardly turned lip 154 is shown at the lower end of cylindrical body 150. The openings in seat 152 and the lower end of body portion 150 are larger in diameter than the sight tube 142, so that the sight tube 142 may be universally moved within body portion 150 about the center of curvature of the spherical surface possessed by mounting member 130.

A leveling ring 156 surrounds sight tube 142 below the lip 154. Leveling ring 156 is provided with a central opening that snugly engages the sight tube 140, but which is loose enough so that ring 156 can be moved axially along said sight tube 142. A helical compression spring 158 surrounds the sight tube 132 below leveling ring 156 and is urged against the under surface of leveling ring 156 by means of a nut 160 threaded onto the externally threaded lower end portion of sight tube 142. A certain amount of lateral force is necessary to slide leveling ring 156 laterally relative to lip 154. The upper surface of ring 156 may be made concave and the lower surface of lip 154 made convex and both of spherical curvature.

Preferably a circular spirit level 162 is provided on the upper plate 134. As the instrument is being set up, the user manipulates the legs of the tripod until the bubble in level 162 indicates that the plates 134, 136 are approximately level. Next, the user places his hand below the mounting head 10 and moves the leveling ring 156 to-and-fro and/or side-to-side while again watching the bubble in level 162. When the bubble is approximately centered, he removes his hand, and the instrument is ready to use.

FIG. 5 shows the telescope assembly in a position wherein the optical axis OA1 of telescope 20 is out of level, but the sight line SL1 is level and the sight line SL2 is, as viewed by the user, related perpendicularly to sight line SL1. FIG. 6 shows a similar condition, but with the telescope 20 being inverted and the telescope 76 having a zenith view rather than a nadir view. FIG. 8 shows the out-of-level position taken by the mounting rings 46, 48 when the transverse mounting axis of the telescope 20 is not level, and the level position of tube 36 wherein the horizontal hair 32 is horizontal and the vertical hair 30 is vertical, owing to their connection to the float 32 through the intermediacy of tube 38 and rod 44.

Having thus described the invention, it is clear that the objects as stated had been obtained in a simple and practical manner. While a particular embodiment of the invention has been shown and described, it is understood that changes may be made in the construction and arrangement of the various parts without departing from the spirit and scope of the invention as expressed in the following claims. Alternative arrangements include an instrument wherein the nadir and lateral telescopes are omitted, or in which only the forward and nadir telescopes are included, or an instrument in which only one lateral telescope is used in conjunction with a forward telescope alone, or with a forward telescope in conjunction with a nadir telescope. Also, a single, turret mounted eyepiece may be used to serve all three of the right angle telescopes. The turret could be made to revolve about the rearward portion of telescope 20 in a manner such that the eyepiece can be selectively positioned to become a part of the nadir telescope or a part of either one of the two lateral telescopes.

Having thus described my invention, I claim as follows:

What is claimed is:

1. In a level for builders and the like, a refracting telescope having a relatively fixed optical axis; a reticle support tube having a longitudinal axis; a reticle in said support tube having a center lying on said longitudinal axis; means mounting said support tube for universal movement about a point lying on both the optical axis of the telescope and the longitudinal axis of the support tube, which point is offset axially from the center of said reticle; a float chamber vertically adjacent said support tube, said chamber including wall means for confining a body of liquid, with an outlet in said wall means opening towards said support tube; a body of liquid in said chamber at a level below said outlet; a float in said chamber supported by said body of liquid; and means extending through said outlet and interconnecting said float and said support tube so that movement of the former is transmitted to the latter and the longitudinal axis of the support tube is maintained in parallelism with the surface of said body of liquid.

2. The combination of claim 1, wherein the means universally mounting the support tube comprises guide sleeve means fixed relative to said float chamber; a cylinder rotatively received in said guide sleeve means in surrounding concentric relationship with said reticle support tube, said cylinder being formed to include an enlarged side opening through which the means that interconnects the float and the support tube extends; and means mounting said support tube for pivotal movement within said cylinder about a transverse axis which intersects said point on both the optical axis of the telescope and the longitudinal axis of the support tube.

3. The combination of claim 2, wherein the means mounting the support tube for pivotal movement within said cylinder comprises a pair of diametrically opposed pivots affixed to one of said tube and said cylinder and having end portions received in sockets formed in the other.

4. The combination of claim 2, wherein said guide sleeve means comprises a pair of axially-spaced rings secured to the float chamber.

5. An invertible level for builders and the like comprising a refracting telescope mounted for 360° rotation about a transverse axis, said telescope having a relatively fixed optical axis; a reticle support tube having a longitudinal axis; a reticle in said support tube having a center lying on said longitudinal axis; means mounting said support tube for universal movement about a point lying on both the optical axis of the telescope and the longitudinal axis of the support tube, which point is offset axially from the center of said reticle; a float chamber vertically adjacent said support tube and fixed relative to the telescope for invertibility therewith, said chamber including wall means for confining a body of liquid both when the telescope is upright and when it is inverted, with an outlet in said wall means opening towards said support tube; a body of liquid in said chamber at a level below said outlet; a float in said chamber supported by said body of liquid; and means extending through said outlet and interconnecting said float and said support tube so that movement of the former is transmitted to the latter and the longitudinal axis of the support tube is maintained in parallelism with the surface of said body of liquid.

6. A level according to claim 5, wherein said float chamber wall means includes inboard and outboard ends, with said inboard end being situated closer to the reticle support tube and having an open center, side wall means, and a tubular inner wall surrounding said open center and extending in said float chamber from said inboard end towards but terminating short of said outboard end, with the terminal of said tubular inner wall constituting the said outlet when the float chamber is upright. and the open center of said inboard wall constituting the said outlet when the level is inverted and the float chamber is upside down.

7. A level according to claim 6, wherein said float comprises a body of buoyant material having a circular base disposed between said outboard end and the terminal of said tubular inner wall, and an annular wall extending from said base toward said inboard wall in surrounding, concentric relationship with a part of said tubular inner wall, with an inner cavity being defined by said base and said annular wall, with cavity sufficiently large to permit ample clearance for the said inner wall in event the latter becomes relatively tipped in the former.

8. A level according to claim 7, wherein at least one drain port is provided in the base of said float, for communicating the inner cavity of said float with the space between the base of said float and the outboard end of said float chamber when the float chamber is upside down.

9. In an optical instrument: a reticle support tube; a reticle in said tube; wall means on opposite sides of said tube; means mounting said tube for pivotal movement relative to said wall means, including a pair of pivots secured to one of said reticle support tube and wall means, at diametrically opposed locations relative to the support tube, and having pointed ends extending into socket openings formed in the other; a float chamber offset vertically from said support tube, said chamber having an outlet in it directed toward said support tube; a body of liquid in said chamber; a float in said chamber supported by said body of liquid; and a rod extending through said outlet and interconnecting said float and said support tube so that movement of the former is transmitted to the latter.

10. The combination of claim 9, further including spring means between said rod and said float for permitting axial movement of the rod relative to the float in response to movement of the float due to thermal contraction of expansion of said body of liquid.

11. A level for builders and the like comprising: a support including a pair of spaced apart standards; a casing disposed between said standards; means mounting the casing for 360° pivotal movement including a pair of coaxial tubular trunnions extending outwardly on opposite sides from said casing through openings in said standards; a first refracting telescope in said casing having an optical axis related perpendicularly to the axes of said tubular trunnions; a reticle support tube in said casing having a longitudinal axis; a reticle in said support tube having a center lying on said longitudinal axis; means mounting said support tube for universal movement about a point lying on the optical axis of the telescope, the longitudinal axis of the support tube and the axes of said tubular trunnions, which point is offset along said longitudinal axis from the center of said reticle; a float chamber vertically adjacent said support tube, said chamber including wall means for confining a body of liquid, with a port in said wall means opening towards said support tube; a body of liquid in said chamber; a float in said chamber supported by said body of liquid; means extending through said opening and interconnecting said float and said support tube so that movement of the former is transmitted to the latter and the longitudinal axis of the support tube is maintained in parallelism with the surface of said body of liquid; and a pair of side telescopes of the refracting type disposed outboardly on opposite sides of said first telescope and including forward portions formed by said tubular trunnions, and optical axes, the forward portions of which coincide with the axes of rotation of said trunnions, said side telescopes each also including a reticle having a center on said center of rotation of the trunnions.

12. A level according to claim 11, wherein each side telescope includes a pentaprism in the casing inboardly of its forward portion, and a rearward portion extending rearwardly from said pentaprism to an eye piece, said prism serving to bend the optical axis 90° between the forward and rearward portions of the telescope.

13. A builder's level, comprising: a first telescope having a relatively fixed optical axis; a reticle support tube having a longitudinal axis; a reticle in said support tube having a center lying on said longitudinal axis; means mounting said support tube for universal movement about a point lying on both the optical axis of the telescope and the longitudinal axis of the support tube, which point is the center of said reticle; a float chamber offset axially from the center of said reticle; a float chamber vertically adjacent said support tube, said chamber including wall means for confining a body of liquid, with an outlet in said wall means opening towards said support tube; a body of liquid in said chamber; a float in said chamber supported by said body of liquid; a rod extending through said outlet and interconnecting said float and said support tube so that movement of the former is transmitted to the latter and the longitudinal axis of the support tube is maintained in parallelism with the surface of said body of liquid; a nadir telescope having a right angled optical system composed of a generally horizontal rearward portion and a generally vertical forward portion, with the optical axis in said forward portion being perpendicular to the optical axis of said first telescope at the point of universal movement of said reticle support tube, said right angled optical system including a right angle prism at the intersection of said rearward and forward portions.

14. A builder's level according to claim 13, wherein said nadir telescope comprises an objective lense below said prism and a reticle carrier extends generally horizontally between said prism and said objective lense, a frame extending from said reticle carrier around said prism and towards said reticle tube, a connector extending from said frame towards said reticle tube, a universal joint interconnecting said connector and said reticle support tube, and means mounting said connector at a location intermediate its length for universal pivotal movement a point that is located on a line that is perpendicular to the optical axis of said first telescope and passes through the universal pivot point of said reticle support tube, and is fixed relative to said universal pivot point of said reticle support tube.

15. A builder's level according to claim 14, wherein said connector is a rod and the universal joint that interconnects said connector and the reticle tube comprises a small tube secured to one and a ball snugly but rotatively received in said tube secured to the other.

16. A builder's level comprising: a telescope for use in establishing a vertical plane and a level line in a horizontal plane, and means mounting said telescope for 360° pivotal movement about a transverse axis, said telescope having an optical system including an optical axis and a reticle support tube mounted for universal movement about a point on said optical axis, a reticle in said tube having a vertical hair, a horizontal hair, and center where the two cross, which center is offset axially from said point; a chamber containing a body of liquid, and means for maintaining said horizontal hair and a line between the center of the reticle and the pivot point of the support tube in parallelism with the surface of said body of liquid.

17. A builder's level according to claim 16, further comprising a second telescope for the use in establishing a second vertical plane related perpendicularly to both the first vertical plane and the horizontal plane which second intersects the universal pivot point of said reticle support tube.

18. A builder's level comprising: a telescope support including a base and a pair of laterally-spaced standards extending upwardly from said base; a telescope assembly including a first refracting telescope for forward sighting and a second refracting telescope for nadir sighting, including a forward portion related perpendicularly to said first telescope; means mounting said telescope assembly between said standards for pivotal movement about a transverse axis related perpendicularly to the optical axis of said first telescope in a horizontal plane and perpendicularly to the optical axis of the forward portion of said second telescope in a vertical plane; a nadir sight tube depending below said base, a universal mounting member having downwardly facing spherical base surface, said member interconnecting between said tube and said base; and a mounting head comprising a platform having a central opening through which said sight tube extends, a seat encircling said central opening near the top of said platform, said seat having a spherical support surface engaging the spherical base surface of the universal mounting member, and means for adjustably affixing the position of the lower end of said sight tube relative to the center of curvature of said spherical support surface.

References Cited by the Examiner

UNITED STATES PATENTS

| | | | |
|---|---|---|---|
| 837,315 | 12/1906 | Marshall | 33—73 |
| 1,891,641 | 12/1932 | Habel | 33—73 |
| 2,602,231 | 7/1952 | Madison | 33—72 |

LEONARD FORMAN, *Primary Examiner.*